US009479401B2

(12) United States Patent
Garcia

(10) Patent No.: US 9,479,401 B2
(45) Date of Patent: Oct. 25, 2016

(54) CONFIGURING NETWORK DEVICES

(71) Applicant: Comcast Cable Communications, LLC, Philadelphia, PA (US)

(72) Inventor: Maurice Garcia, Levittown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/135,146

(22) Filed: Apr. 21, 2016

(65) Prior Publication Data

US 2016/0241449 A1   Aug. 18, 2016

Related U.S. Application Data

(63) Continuation of application No. 14/826,308, filed on Aug. 14, 2015, now Pat. No. 9,350,609, which is a continuation of application No. 14/336,177, filed on Jul. 21, 2014, now Pat. No. 9,184,993, which is a continuation of application No. 12/467,860, filed on May 18, 2009, now Pat. No. 8,787,182.

(51) Int. Cl.

| | |
|---|---|
| *H04L 12/26* | (2006.01) |
| *H04L 12/24* | (2006.01) |
| *H04L 12/28* | (2006.01) |
| *H04L 29/06* | (2006.01) |
| *H04L 12/14* | (2006.01) |
| *H04M 1/253* | (2006.01) |

(52) U.S. Cl.

CPC ....... *H04L 41/5025* (2013.01); *H04L 12/1407* (2013.01); *H04L 12/2801* (2013.01); *H04L 41/0816* (2013.01); *H04L 41/5054* (2013.01); *H04L 63/20* (2013.01); *H04M 1/2535* (2013.01)

(58) Field of Classification Search
None
See application file for complete search history.

(56) References Cited

U.S. PATENT DOCUMENTS 6,223,222 B1 * 4/2001 Fijolek ............... H04L 12/2801
                                                          348/E7.071
6,636,485 B1 * 10/2003 Fijolek ............... H04L 12/2801
                                                          370/252

(Continued)

OTHER PUBLICATIONS

International Search Report in related International Patent Application No. PCT/US10/35246 dated Jul. 20, 2010.

(Continued)

*Primary Examiner* — Otis L Thompson, Jr.
(74) *Attorney, Agent, or Firm* — Banner & Witcoff, Ltd.

(57) ABSTRACT

Systems and methods for configuring network devices are provided. Aspects of the disclosure relate to configuration parameters and methods for using configuration parameters to provide enhanced services to users in a network. A first computing device may receive a request for temporary alteration of a communication parameter associated with a communication protocol of a network device. The first computing device may communicate with a second computing device to request and retrieve the updated communication parameter. The first computing device may provide the updated communication parameter to the network device. The updated communication parameter may cause alteration of a communication parameter associated with the communication protocol while leaving unchanged a second communication protocol of the network device.

24 Claims, 3 Drawing Sheets

(56) References Cited

U.S. PATENT DOCUMENTS

| | | | |
|---|---|---|---|
| 7,334,252 B1* | 2/2008 | Millet | H04L 12/2801 370/395.2 |
| 8,787,182 B2 | 7/2014 | Garcia | |
| 2003/0106067 A1* | 6/2003 | Hoskins | H04L 12/2801 725/119 |
| 2003/0194064 A1* | 10/2003 | Lee | G06F 17/30876 379/88.17 |
| 2004/0063497 A1* | 4/2004 | Gould | A63F 13/12 463/42 |
| 2004/0236547 A1* | 11/2004 | Rappaport | G06F 17/509 703/2 |
| 2005/0021649 A1* | 1/2005 | Goodman | G06F 21/316 709/207 |
| 2005/0055708 A1* | 3/2005 | Gould | H04N 7/163 725/25 |
| 2005/0182835 A1* | 8/2005 | Goldberg | H04L 41/22 709/224 |
| 2005/0228892 A1* | 10/2005 | Riley | H04L 12/5695 709/228 |
| 2006/0047769 A1* | 3/2006 | Davis | G06Q 10/107 709/207 |
| 2006/0077951 A1* | 4/2006 | Godas | H04L 45/302 370/351 |
| 2006/0092861 A1* | 5/2006 | Corday | H04L 41/0213 370/256 |
| 2006/0168612 A1* | 7/2006 | Chapman | G06F 11/0709 725/11 |
| 2007/0047449 A1* | 3/2007 | Berger | H04L 12/2801 370/241 |
| 2008/0018427 A1 | 1/2008 | Ezra et al. | |
| 2008/0065883 A1* | 3/2008 | Zeng | H04L 63/0892 713/168 |
| 2008/0114887 A1* | 5/2008 | Bryers | H04L 29/06 709/230 |
| 2008/0130681 A1* | 6/2008 | Hong | H04L 47/34 370/468 |
| 2008/0232801 A1* | 9/2008 | Arnold | H04L 41/0803 398/58 |
| 2009/0109922 A1* | 4/2009 | Livanos | H04L 47/14 370/331 |
| 2009/0109959 A1* | 4/2009 | Elliott | H04L 12/14 370/352 |
| 2010/0157828 A1* | 6/2010 | Oh | H04L 1/1664 370/252 |
| 2010/0299236 A1* | 11/2010 | Cassell | G06Q 30/04 705/34 |

OTHER PUBLICATIONS

Extended European Search Report—EP 10778253A—Mailing date: May 20, 2014.

Canadian Office Action—CA App 2,761,820—Mailing date Jan. 8, 2016.

\* cited by examiner

CONFIGURING NETWORK DEVICES

CROSS REFERENCE TO RELATED APPLICATION

This is a continuation of U.S. application Ser. No. 14/826,308, filed Aug. 14, 2015, which is a continuation of U.S. application Ser. No. 14/336,177, filed Jul. 21, 2014, which is a continuation of U.S. application Ser. No. 12/467,860, filed May 18, 2009, the disclosure of which is hereby incorporated by reference in their entirety.

TECHNICAL FIELD

Aspects of the disclosure relate to network environments. More specifically, aspects of the disclosure relate to improved systems and methods for configuring network devices.

BACKGROUND

Modern network environments generally have a network device at an end user's location to allow the proper reception and transmission of information. For example, in cable communications network environments, end users generally utilize a modem, such as a cable modem, to receive and transmit information through the network. Depending on the size, scope and configuration of the network, other devices such as DSL (Digital Subscription Line) modems and/or an Optical Network Terminal (ONT) unit may be employed. As those skilled in the art will appreciate, each type of network may require a different type of network device and/or may mix and match network devices depending on the network configuration. As used herein, any such network devices are generally referred to as a modem.

The network devices often are configured before they will operate properly for the reception and transmission of information. The configuration may be done manually at the local site, but is more often done in one or more centralized locations. Where one or more centralized locations are utilized, it is often desirable to transmit one or more configuration files to the network device. Often, however, there may be several different network devices being utilized in the network environment. For example, a cable communications network may have several different types of cable modems which may themselves be configured in different ways. Additionally, the network may have other network devices such as DSL modems or optical network terminals. The use of numerous different types of network devices often requires information providers to configure and maintain each of these different types of modems using different configuration files.

Properly generating, testing, storing, and distributing these configuration files often takes a great deal of time, expertise, and labor. Consequently, some content providers have been forced to implement very basic configuration files, however, the service provider may have very little control over the network devices.

Using additional parameters increases the quantity of configuration files needed to be created exponentially. Furthermore, in complex networks it is often a concern whether each distribution point for such configuration files have the latest version of the files. Thus, novel systems and methods for improving the control over network and/or improving the efficiency of managing the network devices would be beneficial to the art.

BRIEF SUMMARY

The following presents a simplified summary of the disclosure in order to provide a basic understanding of some aspects of the disclosure by way of exemplary embodiments. These embodiments do not define key or critical elements of the disclosure or to delineate the scope of the disclosure. The disclosure is defined by the claims. The following summary merely presents some of the concepts of the disclosure in a simplified form as a prelude to the more detailed description of aspects of the disclosure provided below.

Aspects of the disclosure relate to configuration parameters (e.g., novel QoS configuration parameters) and methods for using configuration parameters (e.g., novel QoS configuration parameters) to reduce or eliminate any negative impact caused by anomalies within the network such as a security breach. In one embodiment, a method includes the reception of a status signal regarding the status of a user account. In certain embodiments, the status signal may include information that is indicative of an alteration of a security parameter of the network device or of a second device in electronic communication with the network device. Yet in further embodiments, the status signal may include information that is indicative a quantity and/or quality of data transmitted through a particular location such as a port of the network device.

Aspects of the disclosure may also include the reception of unique identifying information regarding a network device associated with the user account. Illustrative examples of unique identifying information may include data such as MAC address, model number, serial number, a static/dynamic security code, and/or combinations of the foregoing. Indeed, information that may be utilized to specifically identify the network device (such as location within the network, positioning data (such as with a GPS), tap device identification, address and/or telephone number) may be considered to be within the scope of the disclosure. Based upon the unique identifying information and the status signal, a QoS configuration parameter may be selected from a plurality of configuration parameters on a central database. In one embodiment, a collection of configuration parameters may comprise one or more first configuration parameters for configuring a communication parameter, such as speed, of the network device based upon the unique identifying information. In other embodiments, a collection of configuration parameters may include one or more second configuration parameters configurable to alter the ability of the network device to communicate with one or more other devices in the network.

Further aspects of the disclosure relate, inter alia, to providing improved services to an end user. For example, in certain embodiments, services may be customized to allow increased flexibility for both the service provider and the end user. According to some embodiments, systems and/or methods are implemented to alter the communication parameter(s) of a network device. In exemplary embodiments, the communication parameter may include one or more of the following parameters: speed, latency period, ports available for communication, alteration of available services, and/or combinations of any of the foregoing.

In still further embodiments, a request may be received requesting a temporary alteration of the communication speed of the network device. The request may be from a user associated with the user account. Yet, in another embodiment, the request may be from an employee, agent, or process associated with the service provider. In one embodiment, a status signal from the network devices indicates that a financial balance is associated with the user account. A QoS configuration parameter may be configured to limit the transmittal of data using a first communication protocol through the network device, wherein the transmittal of data using a second communication protocol through the network device is not altered.

Of course, the methods and systems of the above-referenced embodiments may include other additional elements, steps, computer-executable instructions, or computer-readable data structures. Additional features and advantages of the disclosure will be apparent upon reviewing the following detailed description.

BRIEF DESCRIPTION OF THE DRAWINGS

The present disclosure is illustrated by way of example and not limited in the accompanying Figs in which like reference numerals indicate similar elements and in which.

DETAILED DESCRIPTION

Aspects of the disclosure relate to novel QoS configuration parameters, methods for providing a configuration parameter in a network device, and the storage of novel QoS configuration parameters in a network. These and other novel aspects of the disclosure may be used individually and/or in combination to improve network environments. In one embodiment, novel QoS configuration parameters may be used to reduce any negative impact caused by security breach within the network. Those skilled in the art upon full review of this disclosure will readily appreciate that the below illustrative embodiments are merely exemplary, and thus are not intended to limit the scope of the appended claims.

A) Exemplary Network Environment

Figure 1:
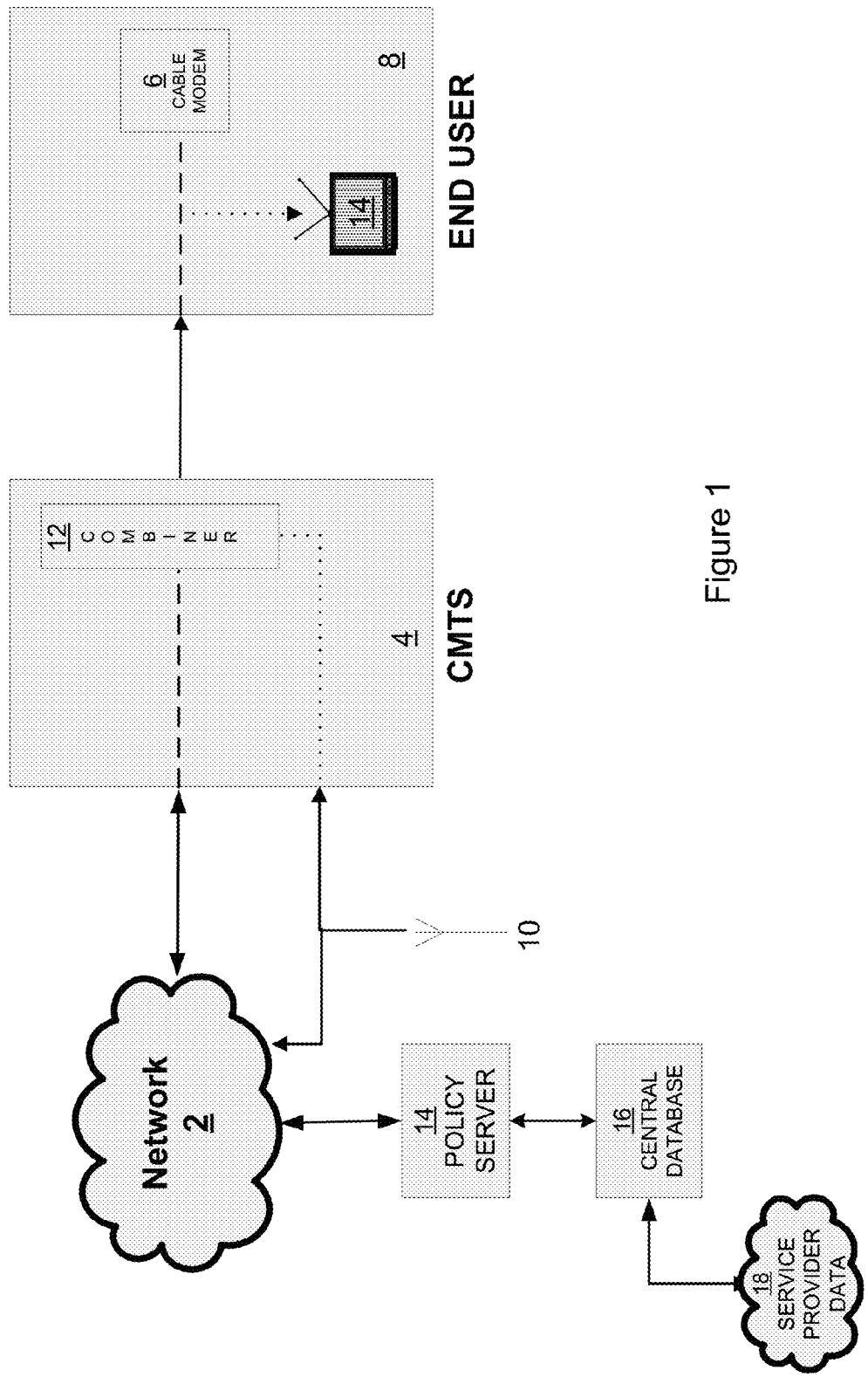
FIG. 1 shows an exemplary network environment in accordance with an embodiment of the disclosure.

FIG. 1 shows an exemplary network environment in accordance with one embodiment of the disclosure. Those skilled in the art will readily appreciate that the exemplary network environment is merely illustrative and other network environments and methods of using such network environments will fall within the scope of this disclosure. Specifically, the exemplary network environment depicts a cable communications network environment, however, other environments, such as fiber optic telecommunications environments, are also within the scope of this disclosure. Indeed, any environment that requires the configuration of one or more network devices is within the scope of this disclosure. Furthermore, while the exemplary environment depicts an illustrative cable communications environment, those skilled in the art will readily appreciate that other electronic devices, such as servers, form part of such a network. In this regard, only specific features of the environment are portrayed in FIG. 1 to more clearly illustrate novel aspects of the embodiment.

As seen in FIG. 1, the network system 1 may include a interconnect network 2 providing electronic communication with one or more cable modem termination systems (CMTS) 4 either via a separate path and/or through the network interconnect network 2. As seen in the exemplary embodiment, the network 2 may connect the CMTS 4 to one or more centralized computing devices, such as policy server 14, central database 16, and/or service provider data 18 (discussed in more detail below). The network 2 may comprise additional computing devices, including communication gateways to different networks including VoIP gateways. For example, in one embodiment, the network 2 may have a communication gateway with a POTS (plain old telephone service) network. Indeed, any type of other network may be accessed through network 2.

The CMTS 4, in turn, is operatively connected to a cable modem 6 located at an end-user location 8 either through a separate connection and/or through network 2 and/or another network. As further seen in FIG. 1, the CMTS 4 may also receive broadcast signals, such as through radio waves received at antenna 10 and/or the network 2. The CMTS 4 may be variously configured. In one embodiment, the CMTS includes a combiner 12 that may combine the signal from network 2 with the signal from antenna 10 before transmission to the end-user location 8. Once received at the end user location 8, specific data, such as QoS configuration parameters, may be received at cable modem 6, while other information, such as audiovisual multimedia delivered in a specific format (i.e., MPEG-2 and/or a NTSC signal) may be received at other equipment 14. Other equipment 14 may include, but not limited to, a set top box, a television, a mobile device, a computer and/or any equipment configured to receive an electronic signal, and combinations thereof.

As known to those skilled in the art, a plurality of modems 6 may be located within each network environment. Thus, modem 6 at end user location 8 may be different than other modems used at other end user locations. The selection of a particular modem may depend on a multitude of factors. Such factors may include, but are not limited to, the infrastructure delivering a signal to the end-user location 8, subscriptions to service plans, economic considerations, and combinations thereof. Regardless of the reasons, broadcast providers must configure each of these different types of modems within their network for them to work properly. Furthermore, configuration files need to be created whenever new modems become available, whenever existing modems need to be updated, and for regular maintenance.

B) Preventing or Reducing the Impact of a Security Breach

Figure 2:
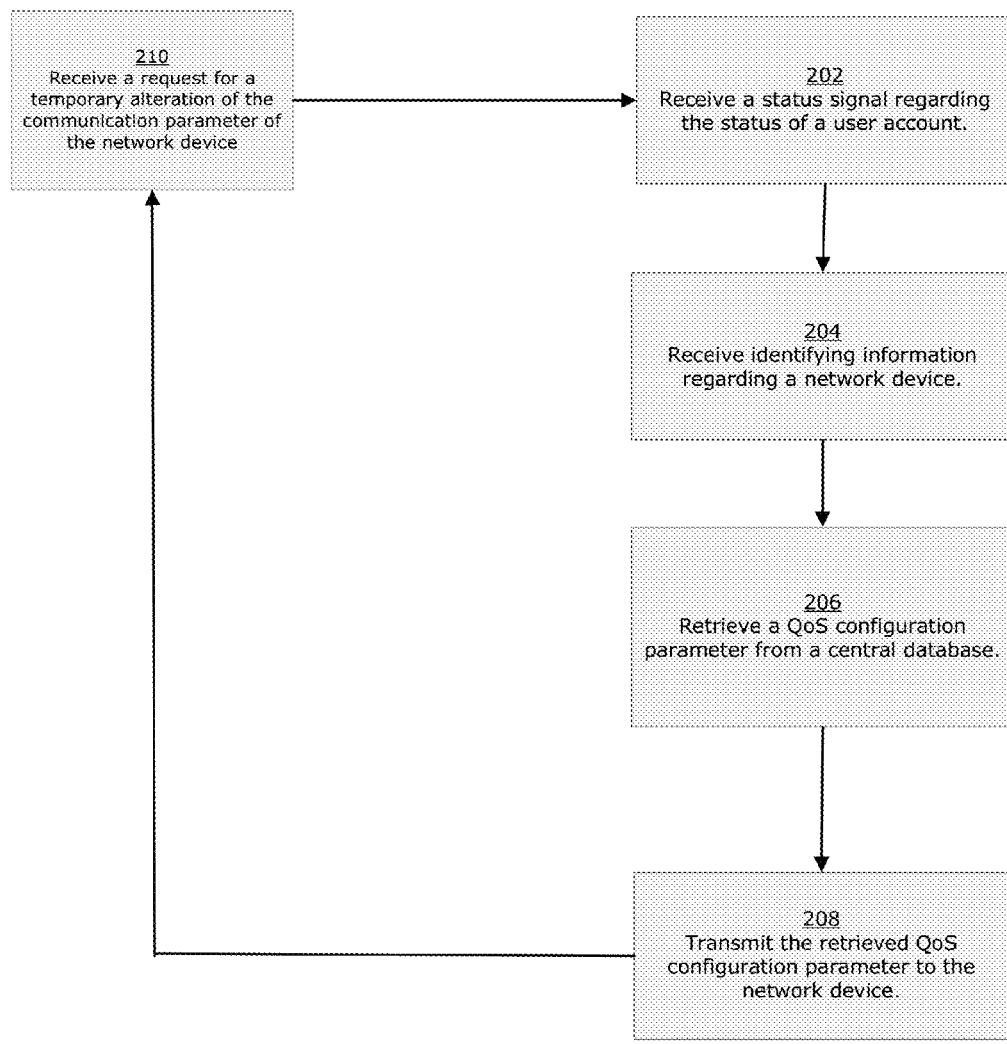
FIG. 2 is a flowchart showing an exemplary method in accordance to an embodiment of the disclosure.

In accordance with certain embodiments of the disclosure, systems and methods may be utilized to prevent or reduce the impact of a security breach in a distributed network, such as the network shown in FIG. 1. FIG. 2 is a flowchart showing an exemplary method in accordance to one embodiment of the disclosure. According to this exemplary embodiment, a status signal regarding the status of the user account is received (step 202). As used herein, the term "status" may refer to technical information (including speed, usage, errors, QoS, type of data such as VoIP, emergency calls, etc.), financial information, demographic information, advertising information and/or combinations thereof regarding a user account. For example, the status may include one or more attributes, such as (but not limited to): the amount of data transmitted through one or more ports, communication protocols, usage patterns, tier of services, quantity and/or types of devices requesting or receiving data, account balance, past due funds, location, and combinations thereof. Additionally, the status signal may comprise information derived from and/or representative of data collected from one or more different network components.

In one embodiment, the status signal comprises information that is indicative of an alteration of a security parameter of the network device or a second device in electronic communication with the network device. In this embodiment, the status signal comprises information that is indicative that a threshold of data transmitted through a particular port of a network device (e.g., an e-mail or FTP port), such as a modem 6, has been surpassed. This information may be useful to determine if one or more computing devices associated with the user account has been infected with a virus. Specifically, known spamming viruses are configured to hijack computing devices and utilize them as spamming servers. In this regard, a virus may utilize an email account to spam a large number of unsolicited individuals. The transmitted emails are often transmitted utilizing a specific communication protocol across a specific port. For example, as shown in the illustrative embodiment of FIG. 1, email messages may be transmitted utilizing SMTP (Simple Mail Transfer Protocol) and transmitted through, for example, port 25 of a modem 6 that is operatively connected to a CMTS 4. Thus, in accordance with one embodiment, a message is received from a CMTS 4 indicating that a quantity of emails sent over a defined time-period has exceeded a threshold. As shown in FIG. 1, the signal may be transmitted from and/or through policy server 14, from and/or through other network devices, and/or directly from and/or through the central database 16 or service provider data 18. As explained in more detail below, utilizing this information in a manner that affects the QoS configuration parameters of one or more network devices, such as modem 6 associated with the user account may limit or eliminate damage caused by such a security breach.

As indicated in step 204, unique identifying information regarding a network device, such as modem 6, that is associated with the user account is received. In one embodiment, information regarding the model or the MAC address of the network device 6 may be received. For example, if the network device 6 is a cable modem, the specific model number of that cable modem may be received. While a cable modem is shown in FIG. 1 as the network device, in other embodiments, the network device 6 is configured to comply with the IEEE 802.16 standard, such as WiMax capable devices.

The unique identifying information of step 204 may be combined with or otherwise associated with other information, including for example, information requesting another QoS configuration file. As an example, in one embodiment, an electronic signal from a network device requests a QoS configuration file or parameter and provides unique identifying information of the network device 6. In this embodiment, the request for the QoS configuration file or parameter may be forwarded by one or more systems or devices, such as through a CMTS, such as CMTS 4. For example, looking to the exemplary network environment shown in FIG. 1, the CMTS 4 may request the QoS file or parameter from a server, such as policy server 14. As discussed in more detail below, an Application Manager may reside or be associated with the policy server or another network device. In one embodiment, the status signal of step 202 and the unique identifying information of step 204 may be associated within the same signal or series of signals.

As shown in step 206, one or more QoS configuration parameters may be selected from a plurality of configuration parameters on a central database, such as from central database 16, based upon the unique identifying information and the status signal. In one embodiment, a collection of configuration parameters located on the central database 16 comprises at least a first parameter for configuring a communication speed of the network device based upon the unique identifying information, and a second parameter configurable to alter the ability of the network device to communicate with another device in the network. As will be appreciated by those skilled in the art, altering the ability of the network device to communicate may be performed in several different ways. In one embodiment, all communications from a network device may be blocked. In other embodiments, only certain types of information may be affected. In still further embodiments, the bandwidth allocated to the device for sending e-mails and/or ftp files may be restricted. For example, if the status signal received in step 202 is indicative that a large quantity of e-mail messages have been transmitted indicative of a virus, then the selected QoS configuration parameter may be configured to prevent further communication from a specific port (i.e., port 25) of the modem 6. The identifying information from step 204 may be utilized to ensure that the selected configuration parameter is compatible with the network device (i.e., cable modem 6).

By selecting a configuration parameter or collection of parameters from a plurality of parameters located on a central database, such as central database 16, one or more advantages may be realized. For example, in one embodiment, utilizing centralized servers or devices prevents duplication and helps ensure that one or more servers possesses the most recent version and/or reduces the amount of communication that must occur across the network to update network devices.

At step 208, the retrieved QoS configuration parameter may be transmitted to a network device, such as modem 6. The configuration parameter may be transmitted through one or more network components before reaching the network device 6. Indeed, in one embodiment, the configuration parameter of step 206 may be transmitted through the policy server 14, despite the fact that the policy server 14 may not necessarily be the source of the configuration parameter.

C) Providing Improved Services

Further aspects of the disclosure relate to providing improved services to an end user. In one embodiment, services may be customized to an end user and allow increased flexibility for both the service provider and the end user. Novel systems and/or methods are implemented to alter the communication abilities of a network device, such as modem 6. In one embodiment, step 210 may be implemented. At step 210, a request may be received. The request of step 210 may be made by a user associated with a user account, such as an account at end user location 8 (FIG. 1). The request of step 210 may be configured to request a temporary alteration of a communication ability of the network device. A communication parameter may be selected from one or more of the following: speed, latency period, alteration of ports available for communication, alteration of available services, and combinations thereof. Indeed, any parameter that affects any communication in regards to one or more ports and/or protocols is within the scope of one or more embodiments of the disclosure.

In certain embodiments, the central database 16 includes or is otherwise in electronic communication with user account data, such as an accounting database. In certain embodiments, the central database contains both the account information regarding the end user location 8 and any configuration parameters available for a plurality of end user locations. In one embodiment, step 210 may occur after step 208, such that a configuration parameter has already been transmitted to the network device. This may be useful, for example, if an end user location 8 already has one or more services from the service provider (and thus has a valid QoS configuration parameter) and wishes to temporarily alter one or more communication parameters. For example, a specific end user location 8 may plan an event that requires a large amount of bandwidth, increased latency, or otherwise requires a modification of the service being received. In one embodiment, a graphical user interface may be provided to a user to receive one or more selections from the user. In one embodiment, a secure website may be utilized to allow a user associated with the end user location 8 to access an account and subscribe to one or more services or modify aspects of an existing service. Step 210 may then be implemented to receive a request for a temporary alteration of a communication parameter of the network device 6. Yet in another embodiment, step 210 may be implemented before any one of the steps 202-208, including step 202. For example, step 210 may allow the network device 6 to be configured with specific features requested by the user, such as when the network device is first configured at an end user location 8.

Further embodiments allow one or more communication parameters of the network device 6 to be automatically changed. In one embodiment, the status signal of step 202 may be indicative that an outstanding financial balance is associated with the account associated with the end user location 8. The status signal may be transmitted from within the central database 16 or any other computer-readable medium (such as from an internal data source "Service Provider Data 18" shown in FIG. 3). In one embodiment, upon receiving the status message indicative of an outstanding account balance, a QoS configuration parameter is selected at step 206 in which the second parameter is configured to limit the transmittal of data using a first communication protocol through the network device, wherein the transmittal of data using a second communication protocol through the network device is not altered. For example, the end user location may have a service plan in which the user receives digital cable television, internet and telephone services from the service provider. In one embodiment, communications regarding the digital cable may be blocked or otherwise unable to be utilized by the user, while still allowing the end user location to receive at least a portion of the telephone services. Those skilled in the art upon review of this disclosure will readily appreciate that any variation on limitation on a myriad of protocols may be implemented.

D) Other Exemplary Embodiments of Aspects of the Disclosure

In exemplary embodiments, a network device (e.g., a DOCSIS® 3.0 cable modem or optical network terminal) may include one or more configuration parameters which may be variously configured. In one exemplary embodiment, the parameters include such things as how fast the modem is permitted to transmit data, how fast the modem is permitted to receive data, the specific vendor supplying the modem equipment, settings in the modem that need to be configured in order to communicate with the cable modem termination system (CMTS), model information, MAC address, serial number, QoS levels, and/or other similar parameters.

For example, a network may include 20 million devices, and each device may be associated with one of over a hundred different vendors, each device may have one or more IP addresses, each device may run a one of 25 or more different speeds, each vendor may have dozens of different models, each device may have 5-10 different quality of service QoS levels, each model may have different versions of firmware, and each firmware version/model may have any number of different settings. Additionally, there are certain bug fixes that are required for certain models of network devices that, when used in certain networks and configurations, have anomalies. This may result in hundreds of thousands of configuration parameters for particular pieces of network equipment. Aspects of the present disclosure allow adjustment of these parameters.

Aspects of the present disclosure can reduce the number of configuration files to a few hundred parameters. These parameters are applicable to any suitable network device including modems, WiMax devices, PC packet multimedia devices, and/or any micro-processing packet-forwarding device.

Figure 3:
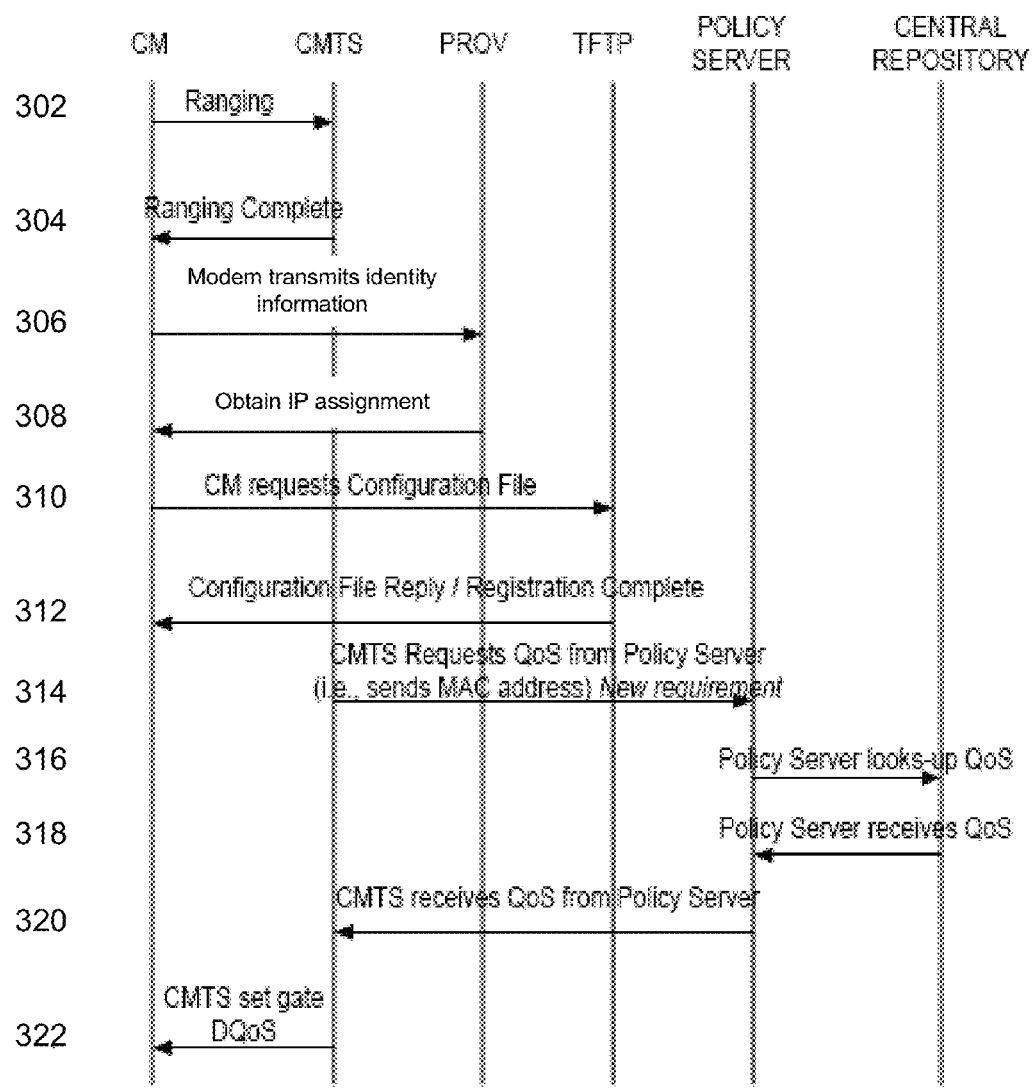
FIG. 3 illustrates an exemplary provisioning method that may be implemented on an exemplary network environment in accordance with embodiments of the disclosure.

As an illustrative example, FIG. 3 shows an exemplary method in reference to the initialization of a cable modem utilizing the DOCSIS® (Data Over Cable Service Interface Specification). Those skilled in the art will readily appreciate that other modems utilizing other specifications as well as other network devices including fiber optic network devices may be utilized without departing from the scope of the disclosure. Generally, QoS configuration files are generally transmitted after first booting up the modem and each time the end-users services change, fixes need to be applied, or otherwise when updating the modem.

Referring to FIG. 3, a network system, such as system 1 shown in FIG. 1, may be variously configured. For example, a configuration process may take place. FIG. 3 shows on the vertical axis one or more steps that may be implemented in a configuration process. FIG. 3 shows on the horizontal axis, the various devices (i.e., as shown in FIG. 1) that may be implicated on one or more of the exemplary configuration process steps. With reference to FIG. 3, in operation, an exemplary system may have the modem or other network device connected and turned on. Once turned on, the network device in step 302 may initiate a ranging operation. During the ranging operation, the modem turns on and it ranges with respect to setting up the physical layer of the connection with the CMTS or other associated network device. In one embodiment, the cable modem 4 will start broadcasting at a very low signal level (i.e., around 8 db). The modem 6 may then gradually increase the signal level until it receives an acknowledgement signal indicating that its power signal is strong enough. In certain embodiments, this may be between approximately 25 to 50 db. Once the CMTS 4 has acknowledged the modem 6, the modem may then identify itself. The CMTS 4 may then either grant or deny access to the network and thus complete the ranging (step 304). If it is denied, the cable modem 6 may repeat step 302.

The cable modem 6 may also determine if it needs to upgrade any internal software (i.e., non-volatile ROM), at step 306, such as sending information regarding the type of device it is (i.e., DHCP Option 43). Next, the cable modem sends a DHCP signal with option 43. This request may be configured as an indication that the modem is connected to the network and to specifically identify attributes associated with the modem including such things as vendor, model number, MAC address, serial number, version number, speed, and other parameters. Further, the option 43 message may provide an indication that the modem is ready to receive other files and/or configuration parameters. The modem 6 may then complete the update at step 308, which may include the resetting of the modem and repetition of step 302, and/or a provisioning system may provide a file and/or parameters to the cable modem. In the embodiment illustrated in FIG. 3, the modem may receive an IP assignment or acknowledgement of an IP address. The provisioning system may determine if the network device is an approved network device for operation on the network system 1. In certain embodiments, the provisioning system may directly poll information from the modem. For example, the provisioning system (using any protocol) may transmit a follow-up message to the modem if not enough information has not been provided. Moreover, step 306 may be omitted or modified in certain embodiments. For example, in certain embodiments, step 306 may be replaced or augmented to implement one or more processes disclosed below in reference to step 314. Indeed, novel features of the present disclosure may limit or eliminate the need for step 306.

At optional step 310, the modem 6 may request a configuration file. In one embodiment, the CMTS 4 or another server may instruct the cable modem 6 to obtain a configuration file. In one embodiment, the cable modem's request is transmitted to a TFTP (Trivial File Transfer Protocol) Server. The configuration file may be provided to the cable modem at step 312. The file may contain information regarding the configuration for the cable modem, IP address (if any), and other data the cable modem needs to access the network properly. The provisioning system then may provide one or more files that has parameter information specific to that particular network device when configured in the specific network system 1. The provisioning system may then provide a specific configuration file for the particular model and revision of the network device. This information may include specific information about the modem, any default transmit and/or receive speeds, limitations on throughput on the modem, service levels, and/or other permissions. Step 310 may be omitted or modified in certain embodiments. For example, in certain embodiments, step 310 may be replaced or augmented to perform one or more processes disclosed below in reference to step 314.

At step 314, a configuration parameter may be requested such as a QoS configuration parameter. In one embodiment, the CMTS 4 may request the QoS configuration from policy server 14 which may be associated with an Application Manager. As used herein, whether in reference to this or any other embodiment, the Application Manager may reside alone, or be coupled with a CMTS, policy server, or another network device. In one embodiment, the Application Manager may reside on the same computer-readable medium or collection of computer-readable mediums as a network device, such as a policy server. Indeed, in one embodiment, the Application Manager may reside on the policy server, however, the software comprising the Application Manager may be distinct from other executable instructions that are required for operation of the policy server. The CMTS 4 may request the configuration from an Application Manager. In one embodiment, the Application Manager, in which the Application Manager resides at the policy server, the Application Manager may still transmit electronic signals to the policy server that instructs a process to be initiated. The request may utilize any known protocols. In one embodiment, the Common Open Policy Server (COPS), Simple Object Access Protocol (SOAP), and/or derivations and combinations thereof may be utilized.

In one embodiment, the request of step 314 may be similar to steps 202 and 204 described above in relation to FIG. 2. Specifically, in one embodiment, a status signal (see step 202) indicating that the cable modem requires a new or additional configuration parameter may be received with or within a time frame of the reception of the unique identifying information (see step 204), such as the MAC address of the modem 6. At step 316, the policy server 14 (in combination with the assistance of an associated Application manager, for example, as discussed in reference with 314) requests a QoS configuration parameter from a central database 16. The selection of the QoS configuration parameter may be similar to that described in relation to step 206 (FIG. 2). Indeed, by selecting a configuration parameter from a plurality of parameters located on a central database, such as central database 16, one or more advantages may be realized. For example, having a central location prevents duplication efforts, efforts required to ensure one or more policy servers possesses the most recent version and/or reduces the amount of communication that must occur across the network to update a plurality of policy servers.

At steps 318-322, the retrieved QoS configuration parameter is transmitted to the network device, such as modem 6. As shown in FIG. 4, the configuration parameter may be transmitted through one or more network components, such as the policy server 14, despite the fact that the policy server 14 is not the source of the configuration parameter (see, i.e. steps 318 and 320). As shown in step 322, DQoS may be used with several protocols and components to establish a guaranteed service. Any type of protocols may be used to convey the electronic signals to one or more network server, such as, for example, DOCSIS®, the Resource Reservation Protocol (RSVP), the Common Open Policy Services (COPS), and PacketCable Event Messaging.

In accordance with this embodiment, when the modem registers, the CMTS may be configured to acknowledge that there has been a registration and send a reply message such as a Common Open Policy Server (COPS) message, to the policy server. The policy server may be configured to send a message to the one or more Central databases to determine the identity of the registering network device. The central database could be a database of information including such information as the particular MAC address and/or any associated set of transmit and/or receive speed parameters. The policy server may be configured to provide a Dynamic quality of service (DQOS) message to the policy server. The policy server may then be configured to forward this information to the CMTS. The CMTS may then configure the QoS of the network device based on the dynamic quality service associated with that unique identifying information, such as the MAC address.

In exemplary embodiments, the number of configuration parameters may be reduced by using this procedure by reducing or eliminating the need to have different configuration files for each modem speed. This exemplary configuration, has the advantage that the speed multiplier in the number of files is no-longer required. For example, the multiplier of 120 vendors by 100 speed tiers may be removed from the number of configuration files required to be maintained by the system. By removing the 120 multiplier on the speed it may be sufficient to simply deal with parameters associated with 120 vendors and/or models.

The speed parameter may be configured at the time of the initial registration, e.g., at step 302-304. The CMTS may then set the quality service at the time of registration. Hence, at the time of registration, the CMTS will already know the modem speeds. This configuration allows the speeds to be broken out as separate configuration parameters as part of a well defined configuration database. By distributing the speed provisioning to the CMTS, it relieves the added complexity at the central database of maintaining additional files for each of the speeds associated with each network device.

Consequently, the central provisioning authority may concentrate of QoS issues such as the overall health of the modem. The speeds, in this embodiment, may then be set by an Application Manager for example, residing in one or more modem termination systems. The Application Manager and/or policy server may assist to determine the appropriate speeds during the setup process as, for example, as part of the initial setup and ranging process. As discussed above, the Application Manager may reside alone, or be coupled with a CMTS, policy server, or another network device. Accordingly, the Application Manager associated with the modem termination system may be configured with a database of only 120 vendors multiplied 40 models multiplied by 100 speeds. In exemplary embodiments, the Application Manager within or otherwise associated with, for example, the Policy Server would communicate with the central database in order to provide back to the CMTS the quality of service and/or transmit/receive speeds associated with the network device.

In these embodiments, having a policy server communicate with the central database and then provision the modem for a particular speed reduces the number of files the policy server must maintain and distribute by a large number. Current systems lack a request from the CMTS to the policy server for a QOS level. Consequently, a large number of files must be maintained at the TFTP server.

Embodiments of the present disclosure include methods for configuring a modem termination system (e.g., a CMTS) to request a QOS from a policy server. Embodiments of the present disclosure also include a policy server that looks up a QOS level and provides this information to a network device such as a modem. Thus, the QoS level may be adjusted dynamically by the policy server based on request from the modem termination system (e.g., CMTS) and/or the cable modem.

In other embodiments, when a modem registers, this registration process initiates a request to the policy server to determine a QOS associated with the registering device. The policy server then makes a request to a central database to determine the QoS associated with the registering network device. The central database may be located at a remote location such as at the main network management center. The central database may be configured to associate a QoS with the unique indentifying information, such as the MAC address, associated with the requesting network device. Of course, other unique identifying information may be utilized such as phone number, physical address, address on the network, and/or serial number. The central database preferably correlates MAC address with a particular speed. The central database may respond to a request from the policy server the speed to the policy server, which then transmits it out to the CMTS upon request from the policy server and/or CMTS so its an automatic provisioning. Consequently, the configuration parameters associated with the speed of each network device do not have to be maintained as single and/or separate personality files.

Further, by uncoupling the speed and/or adjusting the QoS from the configuration files, the QoS and/or speed of the network device may be dynamically modified to meet different network conditions such as the virus attack discussed above. For example, in certain embodiments, the speed may be reduced, traffic may be blocked, and/or the flow of traffic may be altered. Using this configuration method, the QoS can be dynamically and efficiently set in response to changing network conditions.

Further, the central database may be coupled to one or more servers comprising account information to provide pertinent information such as billing information and other back office information relevant for setting QoS. The servers comprising account information may then link to the billing system, which in turn links to the services people have paid for and associated provisioning.

In accordance with this aspect of the disclosure, the CMTS may enforce a network policy (e.g., limiting email spamming from a particular device) without the need for pushing out an entirely new configuration files for that device. In this embodiment, the spamming management may be handled by the CMTS.

Thus the need for the change can be detected at a centralized location in the system such as at the servers comprising account information level and the enforcement of the dynamic policy adjustment may be implement at the modem termination system level (e.g., at the CMTS). In this way, the CMTS enforces the change in policy. The system thus may provide an autonomous and self sustaining QoS. As long as the information in the servers comprising account information is correct, the servers comprising account information can transmit speeds/QOS levels and determine whether or not the device has been detected as an abuser. Thus, the servers comprising account information upon request from the CMTS can automatically provision the modems.

As discussed above, the Application Manager may be part of the policy server. Further, the provisioning, central database, and trivial file transfer protocol server may be combined into a single unit coupled to the CMTS. Further, exemplary embodiments do not require the use of different protocols such as DHCP protocol, TFTP protocol, the policy server protocol, and/or the central database protocol. Additionally, the central database may be integrated as part of the service provider data and/or the billing systems. In this manner, the billing systems already have the data on relating to what customers are paying for what services. Thus, in embodiments, the logical information may be in the billing system and the actual parameters associated with the QoS may be stored in the central database. In these embodiments, the central database may be using the policy server as a method of instruction the modem how fast to send particular types of data dynamically going instead of using one or more configuration files.

With dynamically configurable QoS levels, a consumer may host a special event that requires additional bandwidth. This may be advantageous for business hosting e-commerce events or expect an increase in traffic due to the use of multimedia applications, such as videoconferencing. Additionally, a gamer can purchase increased bandwidth to provide an advantage for on-line games. For example, if faster performance is desired, a gamer can buy one hour of advanced bandwidth. Currently, there is no configuration file (or novel configuration parameters) that allows this type of service. Using embodiments of the disclosure, a gamer could log onto a web site and purchase time durations of increased performance. The enhanced performance can be set to time out. In this manner, a gamer can pay $10 for 1 hour of high speed throughput at the highest speed rate available. Under embodiments of the present disclosure, this can be easily implemented using, for example, the policy server. There are no configuration files that need to be created. The entire modification process can occur automatically using just a message from the policy server and/or a message from the central database to the policy server which is then forwarded to the CMTS. In these embodiments, the CMTS may become the event manager for QoS provisioning.

While the exemplary embodiments have been discussed in broad terms of a cable communications networking environment, the disclosure, however, may be configured for other networking environments including telecommunications environments.

What is claimed is:

1. A method comprising:
   receiving, at a first computing device, a request for a temporary alteration of a communication parameter for a first communication protocol of a network device;
   receiving, from a second computing device and responsive to the request, an updated communication parameter for the network device and associated with the first communication protocol; and
   transmitting the updated communication parameter to the network device, wherein the updated communication parameter causes the temporary alteration of the communication parameter for the first communication protocol while leaving unchanged a second communication protocol of the network device.

2. The method of claim 1, wherein the updated communication parameter causes alteration of a latency associated with the first communication protocol.

3. The method of claim 1, wherein the updated communication parameter causes alteration of a bandwidth associated with the first communication protocol.

4. The method of claim 1, further comprising:
   receiving status information associated with the network device, wherein the updated communication parameter is based on the status information.

5. The method of claim 4, wherein receiving the status information comprises receiving information regarding a quantity of data transmitted through at least one port of the network device.

6. The method of claim 1, wherein receiving the updated communication parameter is based on an identifier associated with the network device.

7. The method of claim 6, wherein the identifier uniquely identifies the network device.

8. The method of claim 6, further comprising:
   determining that the updated communication parameter is compatible with the network device based on the identifier.

9. The method of claim 1, wherein receiving the updated communication parameter comprises receiving the updated communication parameter from a policy server.

10. The method of claim 1, wherein the request for the temporary alteration is received based on a user request via a website to modify one or more aspects of an existing service.

11. The method of claim 1, wherein transmitting the updated communication parameter causes an alteration of one or more first ports associated with the first communication protocol and leaves unchanged one or more second ports associated with the second communication protocol.

12. The method of claim 1, wherein the network device comprises at least one of a gateway or a cable modem.

13. A method comprising:
   receiving, at a first computing device, an indication that a network device requires a temporary alteration of one or more parameters associated with a first communication protocol of the network device;
   receiving, from a second computing device, an updated communication parameter based at least in part on status information associated with the network device; and
   transmitting the updated communication parameter to the network device, wherein the updated communication parameter is usable to alter transmission of data via the first communication protocol by the network device and to not alter transmission of data via a second communication protocol by the network device.

14. The method of claim 13, further comprising:
   receiving the status information associated with the network device, wherein the status information comprises information regarding a quantity of data transmitted through at least one port of the network device.

15. The method of claim 13, wherein the updated communication parameter causes alteration of a latency associated with the first communication protocol.

16. The method of claim 13, wherein the updated communication parameter causes alteration of a bandwidth associated with the first communication protocol.

17. The method of claim 13, wherein transmitting the updated communication parameter causes an alteration of one or more first ports associated with the first communication protocol and leaves unchanged one or more second ports associated with the second communication protocol.

18. The method of claim 13, wherein the network device comprises at least one of a gateway or a cable modem.

19. A method comprising:
   receiving, at a first computing device, a request indicating that a network device requires a temporary alteration of a communication parameter for a communication protocol associated with a first service type;
   receiving, from a second computing device and responsive to the request, an updated communication parameter for the communication protocol associated with the first service type; and
   transmitting the updated communication parameter to the network device, wherein the updated communication parameter causes the temporary alteration of the communication parameter for the communication protocol associated with the first service type and does not cause alteration of a communication protocol associated with a second service type.

20. The method of claim 19, wherein the updated communication parameter relates to an alteration of ports available for communication.

21. The method of claim 19, wherein the updated communication parameter causes alteration of a latency parameter for the communication protocol associated with the first service type.

22. The method of claim 19, wherein the updated communication parameter causes alteration of a bandwidth parameter for the communication protocol associated with the first service type.

23. The method of claim 19, wherein the network device comprises at least one of a gateway or a cable modem.

24. The method of claim 19, wherein the first service type comprises voice over internet protocol (VoIP) communications.

* * * * *

UNITED STATES PATENT AND TRADEMARK OFFICE
CERTIFICATE OF CORRECTION

| | |
|---|---|
| PATENT NO. | : 9,479,401 B2 |
| APPLICATION NO. | : 15/135146 |
| DATED | : October 25, 2016 |
| INVENTOR(S) | : Maurice Garcia |

Page 1 of 1

It is certified that error appears in the above-identified patent and that said Letters Patent is hereby corrected as shown below:

In the Specification

Column 8, Detailed Description, Line 47:
Please delete "4" and insert --6--

Column 12, Detailed Description, Line 17:
After "CMTS.", delete "¶"

Signed and Sealed this
Twelfth Day of March, 2019

Andrei Iancu
*Director of the United States Patent and Trademark Office*